United States Patent
Mori et al.

(10) Patent No.: US 11,834,362 B2
(45) Date of Patent: Dec. 5, 2023

(54) METHOD FOR PRODUCING MULTILAYERED SILICA GLASS BODY

(71) Applicants: Heraeus Quarzglas GmbH & Co. KG, Hanau (DE); SHIN-ETSU Quartz Products Co., Ltd., Tokyo (JP)

(72) Inventors: Tatsuya Mori, Koriyama (JP); Akihiko Sugama, Koriyama (JP)

(73) Assignees: Heraeus Quarzglas GmbH & Co. KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 340 days.

(21) Appl. No.: 17/286,062

(22) PCT Filed: Sep. 3, 2019

(86) PCT No.: PCT/JP2019/034534
§ 371 (c)(1),
(2) Date: Apr. 16, 2021

(87) PCT Pub. No.: WO2020/079975
PCT Pub. Date: Apr. 23, 2020

(65) Prior Publication Data
US 2021/0371321 A1    Dec. 2, 2021

(30) Foreign Application Priority Data
Oct. 17, 2018   (JP) .................................. 2018-195764

(51) Int. Cl.
*C03B 17/02*    (2006.01)
*C03B 18/02*    (2006.01)
(Continued)

(52) U.S. Cl.
CPC ............ *C03B 18/02* (2013.01); *C03C 17/007* (2013.01); *C03C 17/02* (2013.01); *C03C 23/007* (2013.01); *C03C 2218/117* (2013.01)

(58) Field of Classification Search
None
See application file for complete search history.

(56) References Cited

U.S. PATENT DOCUMENTS

2006/0038470 A1   2/2006   Maul et al.
2008/0066497 A1   3/2008   Weber et al.
(Continued)

FOREIGN PATENT DOCUMENTS

DE   10 2005 058 819   4/2007
DE   10 2008 016 230   5/2009
(Continued)

OTHER PUBLICATIONS

Written Opinion of the International Searching Authority for PCT/JP2019/034534 dated Nov. 26, 2019.

*Primary Examiner* — Cynthia Szewczyk
(74) *Attorney, Agent, or Firm* — Dicke, Billig & Czaja, PLLC (57) ABSTRACT

One aspect is a method for producing a multilayered silica glass body. The method involves producing a multilayered silica glass body in which a transparent silica glass layer is provided on the surface of a siliceous substrate made of a siliceous material. The method includes preparing the siliceous substrate, preparing a silica slurry in which silica particles are dispersed in a liquid, applying the silica slurry to the surface of the siliceous substrate, leveling the silica slurry applied to the surface of the siliceous substrate by applying vibration to the siliceous substrate, drying the leveled silica slurry, and vitrifying the dried silica slurry by heating to form a transparent silica glass layer. As a result, a transparent silica glass layer of uniform thickness is obtained at excellent yield, and a method for producing a multilayered silica glass body easily in a short time is provided.

7 Claims, 2 Drawing Sheets

(51) Int. Cl.
  *C03C 17/00* (2006.01)
  *C03C 17/02* (2006.01)
  *C03C 23/00* (2006.01)

(56) References Cited

U.S. PATENT DOCUMENTS

| | | |
|---|---|---|
| 2010/0115996 A1 | 5/2010 | Werdecker et al. |
| 2013/0225862 A1* | 8/2013 | Tateno ................ B01J 27/0576 502/248 |
| 2015/0143848 A1 | 5/2015 | Schenk et al. |

FOREIGN PATENT DOCUMENTS

| | | |
|---|---|---|
| JP | 2004067456 | 3/2004 |
| JP | 2010199186 | 9/2010 |

* cited by examiner

METHOD FOR PRODUCING MULTILAYERED SILICA GLASS BODY

CROSS REFERENCE TO RELATED APPLICATION

This Utility Patent Application claims priority under 35 U.S.C. § 371 to International Application Serial No. PCT/JP2019/034534, filed Sep. 3, 2019, which claims the benefit of Japanese Patent Application No. 2018-195764, filed Oct. 17, 2018; which are both incorporated herein by reference.

TECHNICAL FIELD

The present invention relates to a method for producing a multilayer-structure silica glass body.

BACKGROUND ART

Silica glass has high purity and high heat resistance, and is therefore used in various types of parts internal to semiconductor heat treatment apparatuses. Opaque silica glass (an opaque silica glass body) which reflects heat radiation (infrared radiation) is sometimes used in a portion of the interior of semiconductor heat treatment apparatuses. Opaque silica glass bodies are produced by forming microbubbles or particle interfaces within silica glass. Diffuse reflection is produced by the bubbles or particle interfaces in opaque silica glass bodies, which can therefore reflect heat radiation.

Bubbles or particle interfaces are present within opaque silica glass bodies such as these, so minute surface voids are likely to open and produce surface roughening when etching is carried out using hydrofluoric acid before and after use, etc. As a result, particles of silica glass are formed from the surface of the opaque silica glass body, causing an adverse effect on heat-treated semiconductor products. Additionally, impurity penetrates into the voids which have opened in this way, leading to a reduction in purity.

In order to solve this problem, a multilayer-structure glass sheet in which transparent silica glass is laminated on both surfaces of an opaque silica glass body and heated by means of a combustion burner so that the opaque silica glass body and the transparent silica glass are fused together has been reported, as described in Patent Document 1, for example. According to that document, surfaces of the opaque silica glass body are sealed by transparent silica glass layers, and therefore particles from the surfaces can be suppressed even if etching is performed using hydrofluoric acid. However, the method disclosed in that document requires a cutting process as a post-step because the multilayer-structure glass sheet is produced in a square shape or an elliptical shape. Products produced therefrom often have a circular shape, and there is a large amount of loss because of the processing to form a circular shape from a square shape or an elliptical shape, leading to a problem in terms of poor yield.

Patent Document 2 describes a method in which amorphous $SiO_2$ and an alcohol are mixed to form a silica slurry, which is then coated and dried on an opaque sintered compact by means of a doctor blade or a screen printing process, and the slurry is transparentized in a vitrification furnace. There are problems with that method, however, in that vitrification takes time and it is difficult to coat the silica slurry thickly and smoothly.

Patent Document 3 describes a method in which synthetically-produced silicon dioxide or a purified natural quartz material (particle size 200-5000 μm) is introduced into a drum mill and wet-ground for 3 days to form a silica slurry, which is then coated and dried on a transparent or opaque quartz glass flange, and the slurry is transparentized by means of an oxyhydrogen burner flame. There are problems with that method, however, in that contamination from the wet-grinding is likely to penetrate, and the grinding takes time.

PRIOR ART DOCUMENTS

Patent Documents

Patent Document 1: JP 2004-067456 A
Patent Document 2: JP 2010-531799 A
Patent Document 3: JP 2008-510676 A

SUMMARY OF THE INVENTION

Problems to be Solved by the Invention

The present invention takes account of the problems mentioned above, and the purpose thereof lies in providing a method for producing a multilayer-structure silica glass body with a good yield, in which a transparent silica glass layer having a uniform thickness is obtained, and this is achieved simply and in a short time.

Means for Solving the Problems

The present invention was devised in order to solve the abovementioned problems, and provides a method for producing a multilayer-structure silica glass body, for the production of a multilayer-structure silica glass body in which a transparent silica glass layer is provided on a surface of a siliceous substrate comprising a siliceous material, the method being characterized by comprising: a step of preparing the siliceous substrate; a step of preparing a silica slurry in which silica particles are dispersed in a liquid; a step of coating the silica slurry on the surface of the siliceous substrate; a step of smoothing the silica slurry coated on the surface of the siliceous substrate by applying vibration to the siliceous substrate; a step of drying the smoothed silica slurry; and a step of vitrifying the dried silica slurry by means of heating to form the transparent silica glass layer.

The method for producing a multilayer-structure silica glass body of the present invention achieves a better yield than a method in which quartz glass sheets are bonded together and then cut to produce a multilayer-structure silica glass body, which is one of the conventional methods. Furthermore, after the silica slurry has been coated, a high-density dry film is obtained with a more uniform thickness than in a conventional method, so it is possible to obtain a smooth transparent silica glass layer with few bubbles and with little sheet deformation.

Here, a vibration acceleration of the vibration is preferably set at between 0.10 m/s$^2$ and 5.0 m/s$^2$.

By virtue of a vibration acceleration such as above, it is possible to efficiently smooth the silica slurry coated on the surface of the siliceous substrate.

Furthermore, according to the method for producing a multilayer-structure silica glass body of the present invention, preferably, the silica slurry contains silica large particles comprising a siliceous material and having a particle size of between 200 μm and 700 μm, and silica medium particles comprising a siliceous material and having a particle size of 30 μm or more, and less than 200 μm; the total mass of the silica large particles and the silica medium particles contained in the silica slurry is 80% or more of the mass of all particles comprising a siliceous material contained in the silica slurry; and the silica large particle mass/silica medium particle mass, which is a ratio of the mass of the silica large particles and the mass of the silica medium particles, is set at between 0.25 and 7.0.

Furthermore, according to the method for producing a multilayer-structure silica glass body of the present invention, preferably, the silica slurry contains silica small particles comprising a siliceous material and having a particle size of less than 30 μm; and the silica small particles contained in the silica slurry constitute 2% or more of the mass of all particles comprising a siliceous material contained in the silica slurry.

By providing the silica particles (large particles, medium particles and small particles) contained in the silica slurry in proportions such as described above in accordance with the size of the particles, it is possible for a smooth transparent silica glass layer with no cracks and with few bubbles to be formed more reliably.

Furthermore, according to the method for producing a multilayer-structure silica glass body of the present invention, the liquid contained in the silica slurry is preferably water.

By using water as the liquid for dispersing the silica particles in the silica slurry in this way, it is possible to easily manufacture a silica slurry which is advantageous as a starting material for the transparent silica glass layer which is formed in the method for producing a multilayer-structure silica glass body according to the present invention.

Furthermore, the siliceous substrate preferably comprises opaque silica glass.

By using this kind of substrate comprising opaque silica glass as the substrate, it is possible to produce a multilayer-structure silica glass body which is advantageous for reflecting heat radiation.

Furthermore, vitrification of the silica slurry is preferably performed by means of heating employing a burner.

By using a burner for vitrifying the silica slurry in this way, heating can be performed more rapidly than when a furnace or the like is used, and the vitrification time can be considerably shortened.

Furthermore, according to the method for producing a multilayer-structure silica glass body of the present invention, the silica slurry may also be coated on the siliceous substrate while the siliceous substrate is being vibrated.

In the present invention, vibration may be applied after coating of the silica slurry on the surface of the siliceous substrate has ended, but it is also possible to coat the silica slurry on the siliceous substrate while the siliceous substrate is being vibrated.

Advantage of the Invention

The yield achieved by the present invention is better than that of a method for producing a multilayer-structure silica glass body in which quartz glass sheets are bonded together and then cut, which is one of the conventional methods.

Furthermore, after the silica slurry has been coated, a high-density dry film is obtained with a more uniform thickness than in a conventional method, so it is possible to obtain a smooth transparent silica glass layer with few bubbles and with little sheet deformation.

MODE OF EMBODIMENT OF THE INVENTION

Figure 3:
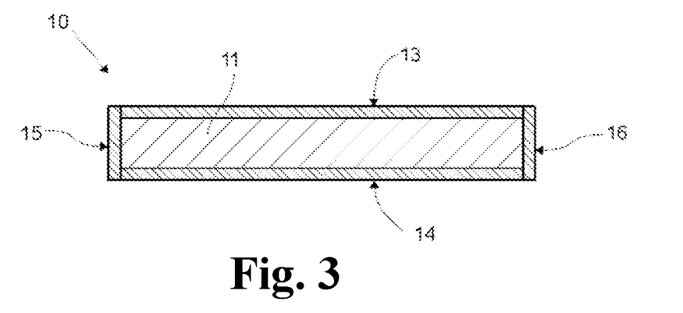
FIG. 3 is a schematic diagram in cross section showing an example of a multilayer-structure silica glass body.

The present invention will be described more specifically below with reference to the drawings. FIG. 3 shows an example of a multilayer-structure silica glass body which can be produced by means of the method for producing a multilayer-structure silica glass body of the present invention. A multilayer-structure silica glass body 10 comprises transparent silica glass layers 13, 14, 15, 16 on surfaces of a siliceous substrate 11 comprising a siliceous material.

The siliceous substrate 11 is preferably a substrate comprising opaque silica glass. By using this kind of substrate comprising opaque silica glass as the substrate, it is possible to produce a multilayer-structure silica glass body which is advantageous for reflecting heat radiation. It is possible to use a plate-shaped (square-shaped or disk-shaped) substrate as the siliceous substrate 11. The method of the present invention may be applied to a disc-shaped siliceous substrate in particular, so a disc-shaped siliceous substrate is preferred.

Figure 1:
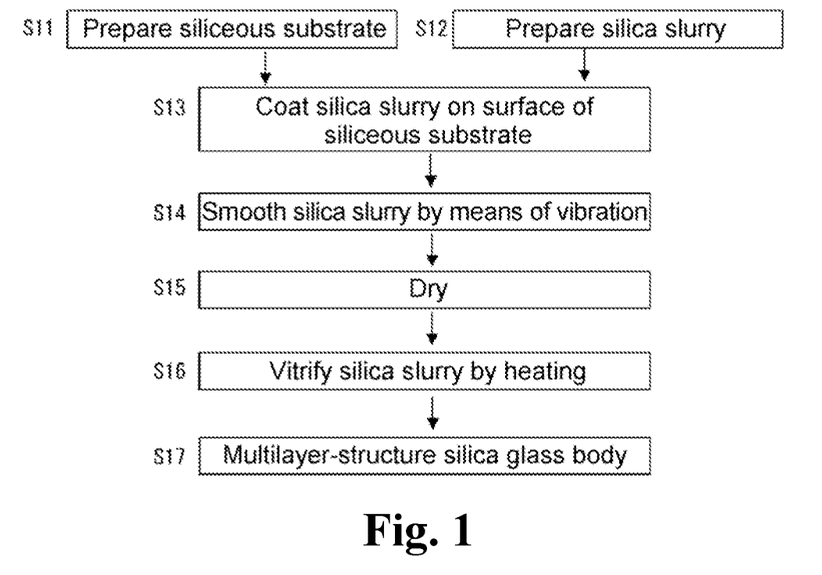
FIG. 1 is a flowchart showing an example of the method for producing a multilayer-structure silica glass body according to the present invention.

The method for producing a multilayer-structure silica glass body according to the present invention comprises the steps shown in the flowchart illustrated in FIG. 1. That is to say, the method comprises: a step of preparing the siliceous substrate (step S11), a step of preparing a silica slurry in which silica particles (silica powder) are(is) dispersed in a liquid (step S12); a step of coating the silica slurry on the surface of the siliceous substrate (step S13); a step of smoothing the silica slurry coated on the surface of the siliceous substrate by applying vibration to the siliceous substrate (step S14); a step of drying the smoothed silica slurry (step S15); and a step of vitrifying the dried silica slurry by means of heating to form the transparent silica glass layers (step S16), whereby a multilayer-structure silica glass body is produced (step S17).

An example (first mode) of the method for producing a multilayer-structure silica glass body according to the present invention will be described in further detail below with reference to the flowchart illustrated in FIG. 1. The siliceous substrate is first of all prepared (step S11). The siliceous substrate which is prepared here constitutes the siliceous substrate 11 illustrated in FIG. 3. The siliceous substrate which is prepared here is preferably a substrate comprising opaque silica glass, as indicated above. Furthermore, there is no particular limitation as to the shape of the siliceous substrate which is prepared here, but it is possible to prepare a plate-shaped substrate. The shape of the siliceous substrate prepared here is largely reflected in the shape of the siliceous substrate 11 constituting the multilayer-structure silica glass body 10 illustrated in FIG. 3.

A silica slurry in which silica particles are dispersed in a liquid is prepared (step S12), along with the preparation of the siliceous substrate of step S11. Either of steps S11 and S12 may be carried out first, or the steps may be performed simultaneously. The liquid contained in the silica slurry is preferably water. By using water as the liquid for dispersing the silica particles in the silica slurry, it is possible to easily manufacture a silica slurry which is advantageous as a starting material for the transparent silica glass layer which is formed in the method for producing a multilayer-structure silica glass body according to the present invention. Furthermore, using water as a dispersion liquid has advantages in that water is inexpensive and non-harmful, etc. Furthermore, it is also possible to suppress contamination from metal impurities by using pure water as the dispersion liquid.

Furthermore, the silica slurry prepared in step S12 preferably contains silica particles comprising a siliceous material and having a particle size of between 200 μm and 700 μm (silica large particles), and silica particles comprising a siliceous material and having a particle size of 30 μm or more, and less than 200 μm (silica medium particles). Furthermore, the total mass of the silica large particles and the silica medium particles contained in the silica slurry is preferably 80% or more of the mass of all particles comprising a siliceous material contained in the silica slurry. Furthermore, the silica large particle mass/silica medium particle mass, which is a ratio of the mass of the silica large particles and the mass of the silica medium particles, is preferably set at between 0.25 and 7.0. By providing the silica particles (large particles and medium particles) contained in the silica slurry in proportions such as described above in accordance with the size of the particles, it is possible for a smooth transparent silica glass layer with no cracks and with few bubbles to be formed more reliably. Furthermore, by using such a silica slurry, it is possible to obtain a thick coating film in excess of 1 mm, for example, with no binder and with no cracks. As a result, it is possible to minimize bubbles even after vitrification.

Furthermore, the silica slurry prepared in step S12 preferably contains silica particles comprising a siliceous material and having a particle size of less than 30 μm (silica small particles). Furthermore, the silica small particles contained in the silica slurry preferably constitute 2% or more of the mass of all particles comprising a siliceous material contained in the silica slurry. By providing the silica small particles contained in the silica slurry in a proportion such as described above, it is possible for a smooth transparent silica glass layer with no cracks and with few bubbles to be formed more reliably. Fumed silica may be suitably used as the silica small particles having a particle size of less than 30 μm.

The silica slurry prepared in step S12 is then coated on the surface of the siliceous substrate prepared in step S11 (step S13). There is no particular limitation as to the coating method. For example, it is possible to employ a method in which the silica slurry is placed on the surface of the siliceous substrate and spread using a silica rod, or the like. In step S13, the silica slurry may also be coated on only one of the surfaces of the siliceous substrate, or it may also be coated on two or more surfaces thereof. Furthermore, the coating and drying, and vitrification (transparentization) may be repeatedly carried out one surface at a time. For example, the silica slurry coated on one surface of the siliceous substrate 11 illustrated in FIG. 3 may be dried and transparentized to form the transparent silica glass layer 13, after which the transparent silica glass layer 14 may be formed by the same procedure, and the transparent silica glass layers 15, 16 may further be formed by the same procedure.

The silica slurry coated on the surfaces of the siliceous substrate is then smoothed by applying vibration to the siliceous substrate (step S14). The silica slurry is smoothed by applying vibration to the siliceous substrate. The transparent silica glass layer is formed while maintaining its shape even after the vitrification in step S16, and therefore it is possible to obtain a multilayer-structure silica glass body having little unevenness. In addition, the silica particles in the silica slurry are precipitated by the vibration so that the slurry increases in density, and therefore there is little contraction during vitrification, and sheet deformation is unlikely to occur. Furthermore, the distance between silica particles becomes closer, so the silica particles can bind without gaps during vitrification, and bubbles contained in the transparent silica glass layer are reduced, even after the vitrification (transparentization).

There is no particular limitation as to the means for imparting vibration. A well-known vibration means such as a commercially-available air vibrator or ultrasonic vibrator may be suitably used.

The vibration acceleration of the vibration in step S14 is preferably set at between 0.10 m/s$^2$ and 5.0 m/s$^2$. By setting the vibration acceleration in this range, it is possible to efficiently smooth the silica slurry coated on the surfaces of the siliceous substrate. Adequate vibration for smoothing can be imparted when the vibration acceleration is equal to or greater than 0.10 m/s$^2$. As a result, after the silica slurry has been dried in step S15, the density of the dry slurry (the layer formed after the silica slurry has been dried) increases, and large bubbles can be made less likely to remain in the transparent silica glass layer after the vitrification in step S16. Meanwhile, sufficient smoothing can be achieved when the vibration acceleration is equal to or less than 5.0 m/s$^2$. When the vibration acceleration is equal to or less than 5.0 m/s$^2$, it is possible to prevent the center of the coated silica slurry from thinning and the peripheral area from thickening, and without the coated silica slurry spreading outwards excessively. It is furthermore possible to reduce height differences in the dry slurry. The lower limit for the vibration acceleration of the vibration is more preferably equal to or greater than 0.50 m/s$^2$, and particularly preferably equal to or greater than 1.0 m/s$^2$. The upper limit for the vibration acceleration of the vibration is more preferably equal to or less than 4.0 m/s$^2$, and particularly preferably equal to or less than 3.0 m/s$^2$.

Furthermore, the time for which vibration is imparted may be set at 20 seconds or greater. The advantage of the present invention can be achieved when the vibration is imparted for a time such as this. Furthermore, the time for which vibration is imparted is more preferably set at 1 minute or greater. There is no particular upper limit for the time for which vibration is imparted, but a time of 10 minutes or less is preferred to take account of producibility.

Furthermore, the vibration frequency (frequency) when vibration is imparted is preferably set at 10 Hz or greater, and preferably at 30 Hz or greater. There is no particular limitation as to the upper limit of the vibration frequency (frequency) when vibration is imparted, and it may be a vibration frequency in the ultrasonic range employed by an ultrasonic vibrator, as mentioned above. However, there is no need for a vibration frequency which is higher than necessary, and 50 kHz may be set as the upper limit.

After step S14, the smoothed silica slurry is dried (step S15). The drying may be carried out by air drying, or it may employ a drying instrument, for example an infrared panel heater, or the like. The dried silica slurry (dry slurry) is then vitrified by means of heating, and the transparent silica glass layer is formed by this heating (step S16). There is no particular limitation as to the vitrification of the silica slurry in step S16, but it is preferably carried out by means of heating using a burner. By using a burner to vitrify the silica slurry, heating can be performed more rapidly than when a furnace or the like is used, and the vitrification time can be considerably shortened.

Figure 2:
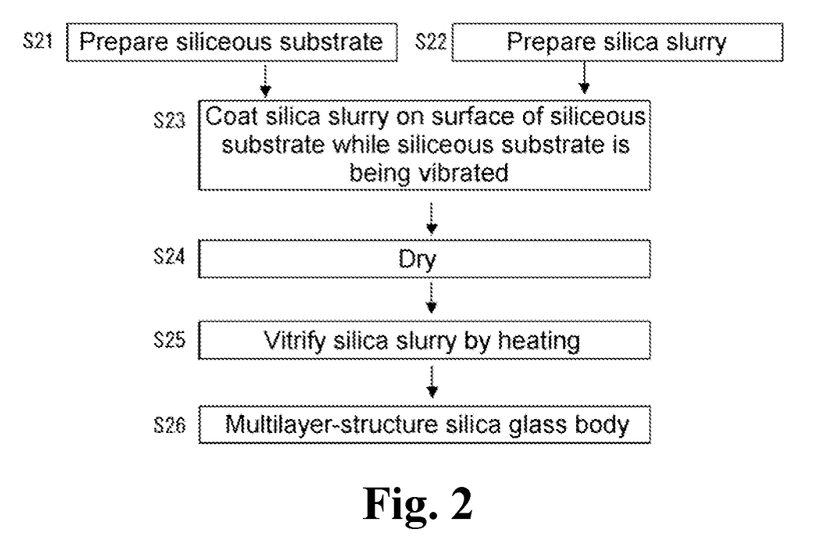
FIG. 2 is a flowchart showing a different example of the method for producing a multilayer-structure silica glass body according to the present invention.

A different example (second mode) of the method for producing a multilayer-structure silica glass body according to the present invention will be described next with reference to FIG. 2.

In this second mode, a step of preparing a siliceous substrate (S21) and a step of preparing a silica slurry in which silica particles are dispersed in a liquid (step S22) are carried out in the same way as in the steps S11 and S12 in the first mode described above.

The silica slurry is then coated on the siliceous substrate while the siliceous substrate is being vibrated (step S23). The silica slurry coated on the surface of the siliceous substrate is smoothed by applying vibration to the siliceous substrate in this method. In the present invention, vibration may be applied after coating of the silica slurry on the surface of the siliceous substrate has ended, as in the first mode, but it is also possible to coat the silica slurry on the siliceous substrate at the same time as the siliceous substrate is being vibrated. This also makes it possible to envisage a shorter processing time.

A subsequent step of drying the smoothed silica slurry (step S24) and a step of vitrifying the dried silica slurry by means of heating to form the transparent silica glass layer (step S25) may be carried out in the same way as in the steps S15 and S16. A multilayer-structure silica glass body may be produced (step S26) via the steps above.

EXEMPLARY EMBODIMENTS

Exemplary embodiments and comparative examples of the present invention will be presented below to describe the present invention in more specific terms, but the present invention is not limited by these exemplary embodiments.

Exemplary Embodiment 1

The multilayer-structure silica glass body 10 illustrated in FIG. 3 was produced via the steps below.

A substrate (a substrate constituting the siliceous substrate 11 illustrated in FIG. 3) comprising disk-shaped opaque silica glass having a diameter of 300 mm and a thickness of 2 mm was first of all prepared as the siliceous substrate (step S11).

A silica slurry in which silica particles were dispersed in a liquid was then prepared in the following manner (step S12). Silica particles (MKC silica: produced by Nihon Kasei Co., Ltd.) having a mean particle size of 500 μm (silica large particles), and silica particles (MKC silica: produced by Nihon Kasei Co., Ltd.) having a mean particle size of 70 μm (silica medium particles) were measured out into a plastic container in a mass ratio of 3:1 to obtain mixed silica particles. Fumed silica NSS3N (mean particle size according to catalogue value: 0.125 μm) and CP102 (mean particle size according to catalogue value: 12 μm) (silica small particles) produced by Tokuyama Corporation, and water, were measured out in a mass ratio of 10:3:150, and stirred for 1 minute 30 seconds at 2000 rpm using a stirrer to obtain a silica fine particle dispersion. The silica fine particle dispersion and the abovementioned mixed silica particles were measured out into a plastic container in a mass ratio of 2:5, and mixed for up to 30 seconds using a polytetrafluoroethylene rod, to obtain a silica slurry (silica slurry for coating) in which silica particles were dispersed in the liquid. It should be noted that in this case, the total mass of silica large particles and silica medium particles contained in the silica slurry was approximately 96.9% of the mass of all silica particles contained in the silica slurry. Furthermore, the mass of silica small particles was approximately 3.1% of the mass of all silica particles contained in the silica slurry.

The silica slurry for coating prepared in step S12 was then placed on the opaque silica glass (both surfaces of which were ground surfaces) having a diameter of 300 mm and a thickness of 2 mm prepared in step S11, and the slurry for coating was spread flat using a silica glass rod. The silica slurry was coated on the surface of the siliceous substrate in this way (step S13).

The silica slurry which had been coated on the surface of the siliceous substrate in step S13 was then smoothed by applying vibration to the siliceous substrate on which the silica slurry had been coated (step S14). In this step, the silica slurry was smoothed by applying vibration at a vibration acceleration of 2.0 m/s² for 1 minute using an air vibrator.

After the silica slurry had been smoothed in step S14, the silica slurry was dried using an infrared panel heater to obtain a dry slurry sheet (a state in which a dry slurry was formed on the surface of the siliceous substrate) (step S15). A gap between the heater and the siliceous substrate on which the silica slurry had been coated was set at 50 mm, and the drying was carried out for 10 minutes. The thickness of the dry slurry was around 1.8 mm.

A propane burner was then moved at a constant speed in relation to the dry slurry sheet obtained in step S15 in order to transparentize the surface thereof (step S16). In this process, the burner movement speed was set at 100 mm/min, the propane flow rate was set at 15 m³/h, the total oxygen flow rate was set at 100 m³/h, and the gap between the dry slurry sheet and the burner was set at 70 mm. As a result of the steps above, the thickness of a transparent silica glass layer was around 1 mm. A multilayer-structure silica glass body was obtained via the steps above (step S17).

Exemplary Embodiment 2

A multilayer-structure silica glass body was obtained in the same way as in Exemplary Embodiment 1, except that silica medium particles having a mean particle size of 50 μm were used instead of the silica medium particles having a mean particle size of 70 μm from Exemplary Embodiment 1.

Exemplary Embodiment 3

A multilayer-structure silica glass body was obtained in the same way as in Exemplary Embodiment 1, except that silica medium particles having a mean particle size of 150 μm were used instead of the silica medium particles having a mean particle size of 70 μm from Exemplary Embodiment 1.

Exemplary Embodiment 4

A multilayer-structure silica glass body was obtained in the same way as in Exemplary Embodiment 1, except that silica large particles having a mean particle size of 250 μm were used instead of the silica large particles having a mean particle size of 500 μm from Exemplary Embodiment 1.

Exemplary Embodiment 5

A multilayer-structure silica glass body was obtained in the same way as in Exemplary Embodiment 1, except that silica large particles having a mean particle size of 600 μm were used instead of the silica large particles having a mean particle size of 500 μm from Exemplary Embodiment 1.

Comparative Example 1

A multilayer-structure silica glass body was obtained in the same way as in Exemplary Embodiment 1, except that the slurry from Exemplary Embodiment 1 was dried without being smoothed by vibration.

Comparative Example 2

Opaque quartz glass having a size of 400 mm²×thickness 5 mm and transparent quartz glass of the same size were bonded using a burner and drawn, and the drawn glass was cut to a diameter size of 300 mm by means of laser cutting to obtain a multilayer-structure glass sheet.

Exemplary Embodiment 6

A multilayer-structure silica glass body was obtained in the same way as in Exemplary Embodiment 1, except that silica particles having a mean particle size of 10 μm (particles in the range of the silica small particles) were used instead of the silica medium particles having a mean particle size of 70 μm from Exemplary Embodiment 1. It should be noted that in this case, the total mass of silica large particles and silica medium particles contained in the silica slurry (the silica slurry did not contain silica medium particles in this exemplary embodiment) was 72.7% of the mass of all silica particles contained in the silica slurry.

Exemplary Embodiment 7

A multilayer-structure silica glass body was obtained in the same way as in Exemplary Embodiment 1, except that silica particles having a mean particle size of 250 μm (particles in the range of the silica large particles) were used instead of the silica medium particles having a mean particle size of 70 μm from Exemplary Embodiment 1.

Exemplary Embodiment 8

A multilayer-structure silica glass body was obtained in the same way as in Exemplary Embodiment 1, except that silica particles having a mean particle size of 100 μm (particles in the range of the silica medium particles) were used instead of the silica large particles having a mean particle size of 500 μm from Exemplary Embodiment 1.

Exemplary Embodiment 9

A multilayer-structure silica glass body was obtained in the same way as in Exemplary Embodiment 1, except that silica particles having a mean particle size of 800 μm (particles even larger than the range of the silica large particles) were used instead of the silica large particles having a mean particle size of 500 μm from Exemplary Embodiment 1. It should be noted that in this case, the total mass of silica large particles and silica medium particles contained in the silica slurry (the silica slurry did not contain silica large particles in this exemplary embodiment) was 24.2% of the mass of all silica particles contained in the silica slurry.

Exemplary Embodiment 10

A multilayer-structure silica glass body was obtained in the same way as in Exemplary Embodiment 1, except that the mass ratio of silica large particles having a mean particle size of 500 μm and silica medium particles having a mean particle size of 70 μm from Exemplary Embodiment 1 was set at 0.1:1.

Exemplary Embodiment 11

A multilayer-structure silica glass body was obtained in the same way as in Exemplary Embodiment 1, except that the mass ratio of silica large particles having a mean particle size of 500 μm and silica medium particles having a mean particle size of 70 μm from Exemplary Embodiment 1 was set at 8.0:1.

Exemplary Embodiment 12

A multilayer-structure silica glass body was obtained in the same way as in Exemplary Embodiment 1, except that the dry slurry sheet from Exemplary Embodiment 1 was heated at 1440° C. for 4 hours under a vacuum atmosphere.

Exemplary Embodiment 13

A multilayer-structure silica glass body was obtained in the same way as in Exemplary Embodiment 1, except that the vibration in Exemplary Embodiment 1 was applied at a vibration acceleration of 0.05 m/s² for 1 minute.

Exemplary Embodiment 14

A multilayer-structure silica glass body was obtained in the same way as in Exemplary Embodiment 1, except that the vibration in Exemplary Embodiment 1 was applied at a vibration acceleration of 6.0 m/s² for 1 minute.

Exemplary Embodiment 15

A multilayer-structure silica glass body was obtained in the same way as in Exemplary Embodiment 1, except that water was used instead of the silica fine particle dispersion in which fumed silica was mixed from Exemplary Embodiment 1.

Exemplary Embodiment 16

A multilayer-structure silica glass body was obtained in the same way as in Exemplary Embodiment 1, except that the silica fine particle dispersion and the mixed silica particles from Exemplary Embodiment 1 were mixed in a mass ratio of 4:1. In this case, the total mass of silica large particles and silica medium particles contained in the silica slurry was 75.8% of the mass of all silica particles contained in the silica slurry.

The abovementioned exemplary embodiments and comparative examples are collated in tables 1 and 2. Table 2 shows the evaluation results.

[Details of Evaluation]

A dry slurry state, a dry slurry density, a vitrification time, a state of bubbles in the transparent silica glass layer ("state of bubbles in transparent layer" in table 2), and a yield were evaluated in relation to the abovementioned exemplary embodiments and comparative examples.

For the dry slurry state, the surface state was visually checked.

For the dry slurry density, the mass and volume of the dry slurry was calculated by measurement.

When the vitrification took less than 1 hour, the vitrification time was deemed "especially good". When the vitrification took less than 1 hour 30 minutes, the vitrification time was deemed "good". When the vitrification took 1 hour 30 minutes or greater, the vitrification time was deemed "somewhat poor", but there were no such cases in the exemplary embodiments or comparative examples.

For the evaluation of the state of bubbles in the transparent silica glass layer, when there were no bubbles having a size of 150 μm or greater within a field of view of 10 mm×10 mm, this was deemed "especially good". When there were no bubbles having a size of 200 μm or greater within a field of view of 10 mm×10 mm, this was deemed "good". When there were one or more bubbles having a size of 200 μm or greater within a field of view of 10 mm×10 mm, this was deemed "poor".

The yield was a value obtained by dividing the mass of the finished multilayer-structure silica glass body by the mass of starting materials.

Results of an overall evaluation of the above items are shown in table 2 as "Evaluation".

TABLE 2

|  | Dry slurry state | Dry slurry density (g/cm³) | Vitrification time | State of bubbles in transparent layer | Yield | Evaluation |
|---|---|---|---|---|---|---|
| Ex. Emb. 1 | Good | 1.54 | Esp. good | Esp. good | 0.81 | Esp. good |
| Ex. Emb. 2 | Good | 1.53 | Esp. good | Esp. good | 0.79 | Esp. good |
| Ex. Emb. 3 | Good | 1.44 | Esp. good | Esp. good | 0.78 | Esp. good |
| Ex. Emb. 4 | Good | 1.53 | Esp. good | Esp. good | 0.82 | Esp. good |
| Ex. Emb. 5 | Good | 1.46 | Esp. good | Esp. good | 0.78 | Esp. good |
| Comp. Ex. 1 | Unevenness present | 1.21 | Esp. good | Poor | 0.79 | Poor |
| Comp. Ex. 2 | — | — | — | — | 0.56 | Poor |
| Ex. Emb. 6 | Small cracks present | 1.52 | Esp. good | Good | 0.78 | Good |
| Ex. Emb. 7 | Good | 1.30 | Esp. good | Good | 0.80 | Good |
| Ex. Emb. 8 | Small cracks present | 1.51 | Esp. good | Good | 0.79 | Good |
| Ex. Emb. 9 | Good | 1.29 | Esp. good | Good | 0.80 | Good |
| Ex. Emb. 10 | Small cracks present | 1.43 | Esp. good | Good | 0.78 | Good |
| Ex. Emb. 11 | Good | 1.28 | Esp. good | Good | 0.81 | Good |
| Ex. Emb. 12 | Good | 1.51 | Good | Esp. good | 0.78 | Good |
| Ex. Emb. 13 | Slight unevenness present | 1.35 | Esp. good | Good | 0.79 | Good |
| Ex. Emb. 14 | Peripheral area somewhat thick | 1.50 | Esp. good | Esp. good | 0.79 | Good |

TABLE 1

|  | Particle size (μm) | | Silica large particle mass/ silica medium particle mass | Vitrification method | Vibration acceleration (m/s²) |
|---|---|---|---|---|---|
|  | Silica large particles | Silica medium particles |  |  |  |
| Ex. Emb. 1 | 500 | 70 | 3 | Burner | 2.0 |
| Ex. Emb. 2 | 500 | 50 | 3 | Burner | 2.0 |
| Ex. Emb. 3 | 500 | 150 | 3 | Burner | 2.0 |
| Ex. Emb. 4 | 250 | 70 | 3 | Burner | 2.0 |
| Ex. Emb. 5 | 600 | 70 | 3 | Burner | 2.0 |
| Comp. Ex. 1 | 500 | 70 | 3 | Burner | 0 |
| Comp. Ex. 2 | — | — | — | Burner (burner used for bonding) | — |
| Ex. Emb. 6 | 500 | 10 (range of small particles) | — | Burner | 2.0 |
| Ex. Emb. 7 | 500 | 250 (range of large particles) | — | Burner | 2.0 |
| Ex. Emb. 8 | 100 (range of medium particles) | 70 | — | Burner | 2.0 |
| Ex. Emb. 9 | 800 (larger range of large particles) | 70 | — | Burner | 2.0 |
| Ex. Emb. 10 | 500 | 70 | 0.1 | Burner | 2.0 |
| Ex. Emb. 11 | 500 | 70 | 8.0 | Burner | 2.0 |
| Ex. Emb. 12 | 500 | 70 | 3 | Vacuum furnace | 2.0 |
| Ex. Emb. 13 | 500 | 70 | 3 | Burner | 0.05 |
| Ex. Emb. 14 | 500 | 70 | 3 | Burner | 6.0 |
| Ex. Emb. 15 | 500 | 70 | 3 | Burner | 2.0 |
| Ex. Emb. 16 | 500 | 70 | 3 | Burner | 2.0 |

Ex. Emb. = Exemplary Embodiment
Comp. Ex. = Comparative Example

TABLE 2-continued

|  | Dry slurry state | Dry slurry density (g/cm$^3$) | Vitrification time | State of bubbles in transparent layer | Yield | Evaluation |
|---|---|---|---|---|---|---|
| Ex. Emb. 15 | Small cracks present | 1.31 | Esp. good | Good | 0.79 | Good |
| Ex. Emb. 16 | Good | 1.52 | Esp. good | Good | 0.79 | Good |

Ex. Emb. = Exemplary Embodiment
Comp. Ex. = Comparative Example
Esp. good = Especially good As is clear from table 2, the method for producing a multilayer-structure silica glass body according to the present invention achieved a better yield than Comparative Example 2 (a method for producing a multilayer-structure silica glass body by bonding quartz glass sheets). Furthermore, it is clear from a comparison of Exemplary Embodiment 1 and Comparative Example 1 that the present invention makes it possible to obtain a smooth transparent silica glass layer with few bubbles.

Figure 4:
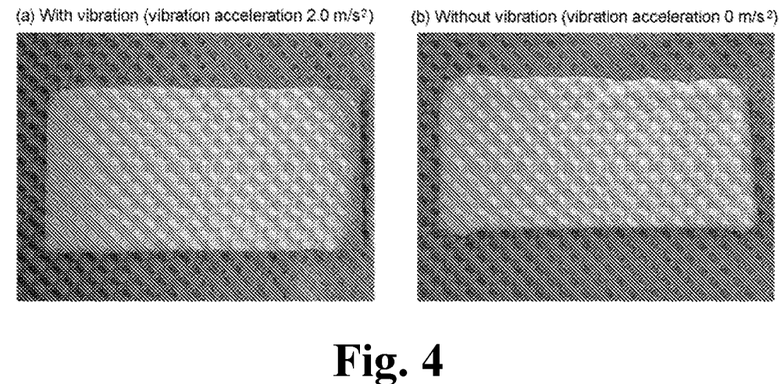
FIG. 4 shows exterior photographs of multilayer-structure silica glass bodies, where (a) is an exterior photograph when vibration was applied after the silica slurry had been coated on the surface of the siliceous substrate (Exemplary Embodiment 17), and (b) is an exterior photograph when vibration was not applied after the silica slurry had been coated on the surface of the siliceous substrate (Comparative Example 3).
Figure 5:
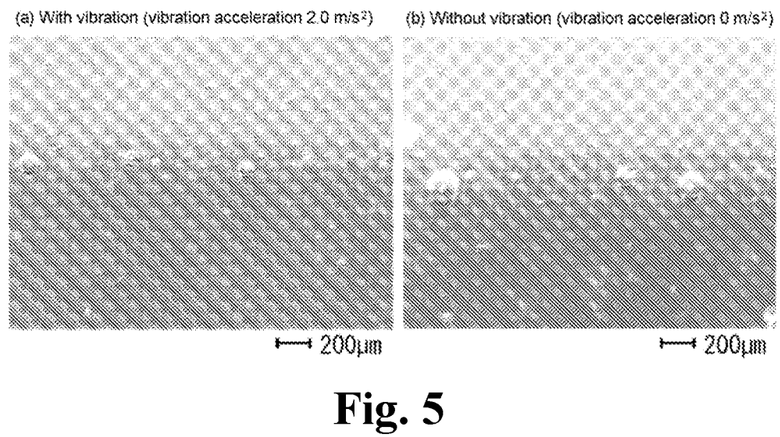
FIG. 5 shows enlarged cross-sectional photographs of multilayer-structure silica glass bodies, where (a) is an enlarged cross-sectional photograph when vibration was applied after the silica slurry had been coated on the surface of the siliceous substrate (Exemplary Embodiment 17), and (b) is an enlarged cross-sectional photograph when vibration was not applied after the silica slurry had been coated on the surface of the siliceous substrate (Comparative Example 3).

Furthermore, multilayer-structure silica glass bodies were produced under essentially the same conditions as in Exemplary Embodiment 1 and Comparative Example 1, but using a cuboid siliceous substrate (Exemplary Embodiment 17 and Comparative Example 3). FIG. 4(a) shows an exterior photograph of the multilayer-structure silica glass body of Exemplary Embodiment 17, and FIG. 4(b) shows an exterior photograph of the multilayer-structure silica glass body of Comparative Example 3. Furthermore, FIG. 5(a) shows an enlarged cross-sectional photograph of the multilayer-structure silica glass body of Exemplary Embodiment 17, and FIG. 5(b) shows an enlarged cross-sectional photograph of the multilayer-structure silica glass body of Comparative Example 3. It is clear from a comparison of FIG. 4(a) and FIG. 4(b) that the transparent silica glass layer could be evenly formed in the method for producing a multilayer-structure silica glass body according to the present invention. Furthermore, it is clear from a comparison of FIG. 5(a) and FIG. 5(b) that the method for producing a multilayer-structure silica glass body according to the present invention makes it possible to reduce the size of bubbles at the interface of the siliceous substrate and the transparent silica glass layer. Moreover, the size (diameter) of the largest bubble in FIG. 5(a) is 108 μm, and the size (diameter) of the largest bubble in FIG. 5(b) is 218 μm.

It should be noted that the present invention is not limited to the mode of embodiment described above. This mode of embodiment is a simple illustration, and any embodiments having the technical concept and substantially the same configuration as disclosed in the claims of the present invention, and demonstrating the same effect are also encompassed by the technical scope of the present invention.

The invention claimed is:

1. A method for producing a multilayer-structure silica glass body, in which a transparent silica glass layer is provided on a surface of a siliceous substrate comprising a siliceous material, the method comprising:
    preparing the siliceous substrate;
    preparing a silica slurry in which silica particles are dispersed in a liquid;
    applying the silica slurry to the surface of the siliceous substrate;
    smoothing the silica slurry coated on the surface of the siliceous substrate by applying vibration to the siliceous substrate;
    drying the smoothed silica slurry; and
    vitrifying the dried silica slurry by means of heating to form the transparent silica glass layer;
    wherein the silica slurry contains silica large particles comprising a siliceous material and having a particle size of between 200 μm and 700 μm, and silica medium particles comprising a siliceous material and having a particle size of 30 μm or more, and less than 200 μm;
    the total mass of the silica large particles and the silica medium particles contained in the silica slurry is 80% or more of the mass of all particles comprising a siliceous material contained in the silica slurry; and
    the silica large particle mass/silica medium particle mass, which is a ratio of the mass of the silica large particles and the mass of the silica medium particles, is set at between 0.25 and 7.0.

2. The method for producing multilayer-structure silica glass body as claimed in claim 1, wherein a vibration acceleration of the vibration is set at between 0.10 m/s$^2$ and 5.0 m/s$^2$.

3. The method for producing a multilayer-structure silica glass body as claimed in claim 1, wherein the silica slurry contains silica small particles comprising a siliceous material and having a particle size of less than 30 μm; and
    the silica small particles contained in the silica slurry constitute 2% or more of the mass of all particles comprising a siliceous material contained in the silica slurry.

4. The method for producing a multilayer-structure silica glass body as claimed in claim 1, wherein the liquid contained in the silica slurry is water.

5. The method for producing a multilayer-structure silica glass body as claimed in claim 1, wherein the siliceous substrate comprises opaque silica glass.

6. The method for producing a multilayer-structure silica glass body as claimed in claim 1, wherein the vitrification of the silica slurry is performed by heating, employing a burner.

7. The method for producing a multilayer-structure silica glass body as claimed in claim 1, wherein the silica slurry is coated on the siliceous substrate while the siliceous substrate is being vibrated.

* * * * *